(12) United States Patent
Nicholson et al.

(10) Patent No.: US 10,782,799 B2
(45) Date of Patent: Sep. 22, 2020

(54) SMART PEN PAIRING AND CONNECTION

(71) Applicant: Lenovo (Singapore) Pte. Ltd., Singapore (SG)

(72) Inventors: John Weldon Nicholson, Cary, NC (US); Scott Edwards Kelso, Cary, NC (US); Steven Richard Perrin, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 553 days.

(21) Appl. No.: 14/276,260

(22) Filed: May 13, 2014

(65) Prior Publication Data

US 2015/0331501 A1 Nov. 19, 2015

(51) Int. Cl.
- *G06F 3/0354* (2013.01)
- *G06F 3/038* (2013.01)
- *G06F 3/041* (2006.01)
- *H04W 4/80* (2018.01)

(52) U.S. Cl.
CPC ........ *G06F 3/03545* (2013.01); *G06F 3/0383* (2013.01); *G06F 3/041* (2013.01); *G06F 2203/0384* (2013.01); *H04W 4/80* (2018.02)

(58) Field of Classification Search
CPC . H04B 5/00; G06F 21/43; G06F 21/35; G06F 2203/0384; G06F 1/1683
USPC ................................ 345/156; 455/41.1–41.2
See application file for complete search history.

(56) References Cited

U.S. PATENT DOCUMENTS

| | | | |
|---|---|---|---|
| 7,715,793 B2 | 5/2010 | Fuccello et al. | |
| 2011/0111792 A1* | 5/2011 | Griffiths | H01Q 1/22 455/553.1 |
| 2013/0090064 A1* | 4/2013 | Herron | H04W 8/005 455/41.2 |
| 2014/0092069 A1* | 4/2014 | Bentov | G06F 1/26 345/179 |
| 2014/0125575 A1* | 5/2014 | Samanta Singhar | 345/156 |
| 2014/0256250 A1* | 9/2014 | Cueto et al. | 455/41.1 |

FOREIGN PATENT DOCUMENTS

| CN | 103002598 A | 3/2013 |
|---|---|---|
| CN | 203084673 U | 7/2013 |
| CN | 103597805 A | 2/2014 |
| CN | 104169899 A | 11/2014 |

* cited by examiner

*Primary Examiner* — Temesghen Ghebretinsae
*Assistant Examiner* — Paras D Karki
(74) *Attorney, Agent, or Firm* — Ference & Associates LLC (57) ABSTRACT

An embodiment provides a method, including: communicating data from a smart pen to a device using a pen input data channel having a first bandwidth; said data including short range wireless connection data; establishing, using said data, a short range wireless connection between the smart pen and the device; and communicating, in a connected condition, higher bandwidth data between the smart pen and the device using the short range wireless connection. Other aspects are described and claimed.

18 Claims, 4 Drawing Sheets

SMART PEN PAIRING AND CONNECTION

BACKGROUND

Devices, e.g., tablets, smart phones, laptops having a digitizer, etc., are increasingly being used in connection with a pen or stylus (hereinafter these terms are used interchangeably) as an input modality. Certain inputs are possible using a completely passive pen, i.e., where the pen itself is not actively transmitting information but simply serves as an implement to provide contact with a screen—similar to a finger input. Other pens are semi-passive in that they transmit data, e.g., location data, but in a reactive manner, e.g., in response to transmission from a digitizer. Still other pens are so-called "smart pens" that actively transmit input data, e.g., location data, other input data (e.g., button press data, pen status data, etc.) from the smart pen to the device. Smart pens are powered and actively communicate such input data via a low bandwidth pen data channel. Typically each smart pen type uses a proprietary low bandwidth pen data channel.

Smart pens are even capable of being paired to a device such as a tablet, smart phone, etc. This provides a standardized connection of higher bandwidth, e.g., a short range wireless connection such as a BLUETOOTH connection. In conventional implementations, this pairing is done using operating system level functions and manual inputs or in some cases a customized application running on the device may be involved but typically does not involve the smart pen transmitting pairing data. Moreover, the pairing between smart pen and device has typically been severely limited to custom applications, which impacts the type of data that is exchanged.

BRIEF SUMMARY

In summary, one aspect provides a method, comprising: communicating data from a smart pen to a device using a pen input data channel having a first bandwidth; said data including short range wireless connection data; establishing, using said data, a short range wireless connection between the smart pen and the device; and communicating, in a connected condition, higher bandwidth data between the smart pen and the device using the short range wireless connection.

Another aspect provides a device, comprising: an input component accepting smart pen input; a display; a processor operatively coupled to the input component and the display; and a memory storing instructions that are executable by the processor to: receive data from a smart pen at the device using a pen input data channel having a first bandwidth; said data including short range wireless connection data; establish, using said data, a short range wireless connection with the smart pen; and communicate, in a connected condition with the smart pen, higher bandwidth data using the short range wireless connection.

A further aspect provides a smart pen, comprising: a tip; and a body; the body includes a processor and a memory storing instructions that are executable by the processor to: transmit data to a device using a pen input data channel; said data including short range wireless connection data; establish, using said data, a short range wireless connection with the device; and communicate, in a connected condition with the device, higher bandwidth data using the short range wireless connection.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Pens are poised to become one of the primary input streams in modern systems, particularly for tablet and like devices. The pen experience can be improved by adding functionality to the pen itself. An example of additional functionality is the ability for the pen and system to communicate in a rich manner over moderate distances, for example, using a BLUETOOTH radio.

One of the challenges with radio communication between pens and devices is the initial setup for connecting, i.e., the initial pairing or bonding process. A distinction between pairing and connecting is that pairing is the one time set up of a bond between a pen and a device. Pairing or bonding is something that has to be done to enable a connection for security purposes. Pairing/bonding is done the first time the devices are connected or set up and includes, e.g., a pin code to confirm that the two devices are to be connected. After two devices are paired or bonded, then they may connect automatically, e.g., via simple use of an identifier. This enables, e.g., a BLUETOOTH peripheral device to reconnect to another device, e.g., a smart phone or tablet, whenever the peripheral device is turned on. The first time devices are paired or bonded usually includes manually initiating the connection, as described herein.

As pen input use becomes ubiquitous, users will want to use the same pen to write on multiple devices, such as their phone and their tablet, in the same location, switching back-and-forth between them. Thus, switching between devices may be desirable while both devices remain within range with respect to short range wireless radios, e.g., BLUETOOTH radios.

As described herein, smart pens are restricted in their conventional implementations to using a pen input data channel, not for pairing and/or connecting, but rather simply for pen input data transmission, including in some examples pen status data (e.g., battery level, button press, etc.). This is primarily because the pen input data channel is very low bandwidth.

While a smart pen has been introduced that is paired using a higher bandwidth short range wireless connection, e.g., a BLUETOOTH connection, this implementation does not pair the smart pen in a specific way, e.g., based on a communication originating from the smart pen, thus switching between devices is cumbersome or impossible. Nor does such a solution utilize the higher bandwidth connection to a maximum extent possible once it has been established. In other words, no smart pen has been developed that allows a specific pairing and connecting to be accomplished in a user friendly way using the pen data channel such that a higher bandwidth short range wireless connection may be used to communicate larger amounts of data, e.g., including for example media files such as pictures or image files, audio/video files, sensor data such as accelerometer, gyroscope or other pen sensor outputs, feedback received by the pen (e.g., for display, such as via a light emitting diode (LED)), data related to additional buttons on the pen, data relating to touch gestures performed with the pen, etc. In effect, the higher bandwidth connection may be generally used to communicate more data, e.g., from and to a pen provided with additional sensors, etc.

Accordingly, an embodiment provides a smart pen that utilizes the pen data channel, i.e., the low bandwidth communication channel that is typically reserved for pen input data (e.g., pen location data) to communicate specific connecting information, which may include first time pairing information for the smart pen (e.g., identification number, pass code/security token) such that a higher bandwidth connection, e.g., a BLUETOOTH connection or a WI-FI connection (as non-limiting examples), may be established automatically between the smart pen and the device (e.g., tablet, smart phone, etc.). In this way, a simple mechanism that is specific, e.g., due to the proximity required to communicate pairing data over the pen data channel and the specificity of the connecting data itself, and convenient for the user, e.g., because the connecting data may be pre-loaded onto the smart pen.

Additionally, following the initial pairing or bonding between the pen and the device, a pen may thereafter use the pen data channel to communicate information, e.g., a pen identification, to quickly establish the higher bandwidth connection with the device. Moreover, the pen may have multiple connections open with multiple devices, but route the data to the devices differently, e.g., based on which device was touched last, which device is the closest, etc. This does not require that the connection between the pen and the (first) device be terminated.

Therefore, in an embodiment, not only is first time pairing of the pen and device accomplished, but also (e.g., each time when the pen touches the screen of a device), a connection is established between the pen and the device. This enables, for example, the pen to switch between writing on two systems regularly, or even back-and-forth.

This may be achieved, for example, by sending the MAC address and other required information of the BLUETOOTH secure simple pairing (SSP) out-of-band (OOB) protocol of the pen to the system through the pen digitizer, i.e., using the pen input data channel. Active capacitive pens have a digital communication mechanism for transmitting information such as pressure and button state, and may be extended to include the required pairing/connecting information. Similarly, EMR digitizers now have the ability to encode binary information, even though they remain entirely passive (or at least battery-free). Once the device (e.g., tablet, smart phone, etc.) has the MAC address (or other such information) of the pen, e.g., touching it or in close proximity therewith, it is a simple matter to initiate a connection (or pairing) to that pen, as needed and on the fly.

The illustrated example embodiments will be best understood by reference to the figures. The following description is intended only by way of example, and simply illustrates certain example embodiments.

Figure 1:
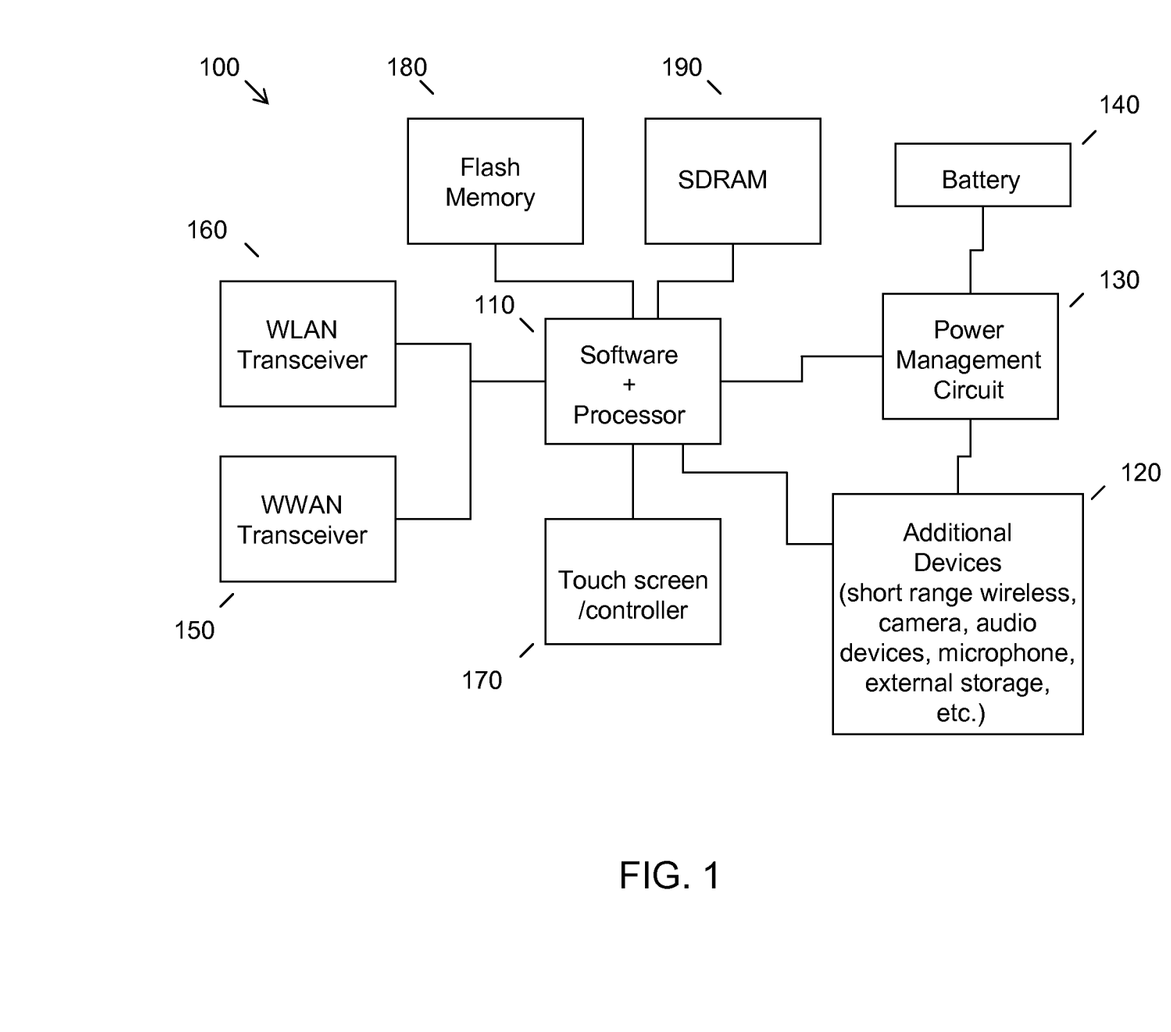
FIG. 1 illustrates an example of information handling device circuitry.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In some designs the BMU is included in the battery itself, although control may be distributed or handled remotely (e.g., in connection with the system processor). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. Commonly, system 100 will include a touch screen/controller 170 for data input and display, e.g., via a stylus or pen as described herein, which may itself include a digitizer or like pen input component or component(s), whether or not co-located with (e.g., overlaying) a display screen. System 100 also typically includes various memory devices, for example flash memory 180 and SDRAM 190.

Figure 2:
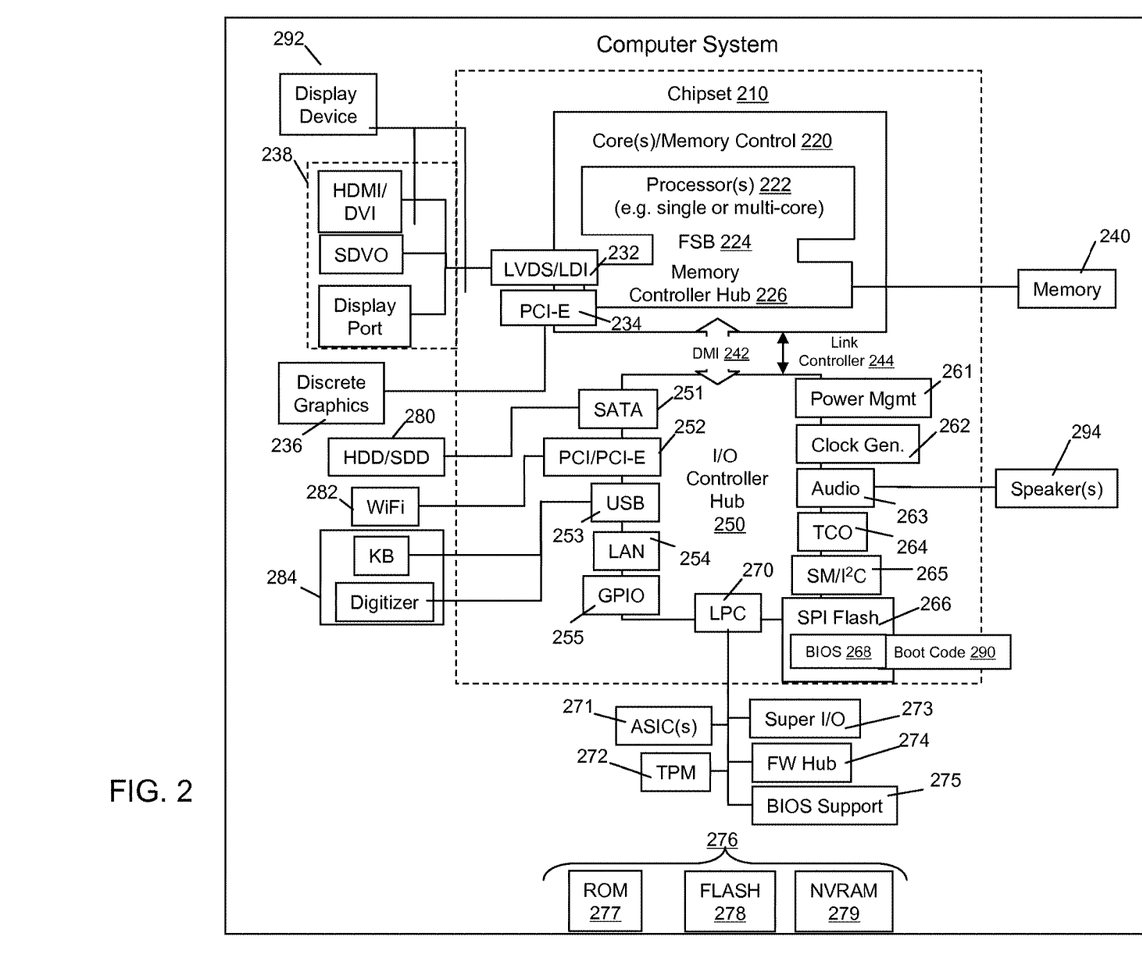
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer that accepts pen data inputs, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261 may manage power output and charging, e.g., as supplied via one or more battery cells of the type described herein, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide a pen input component, e.g., a digitizer such as 284 or a touch screen 170 that accepts pen data input, e.g., using a low bandwidth pen data input channel. Moreover, such circuitry may include components or elements such as short range wireless radios and associated modules, e.g., as illustrated at 120, such that a higher bandwidth short range wireless connection may be established.

Figure 3:
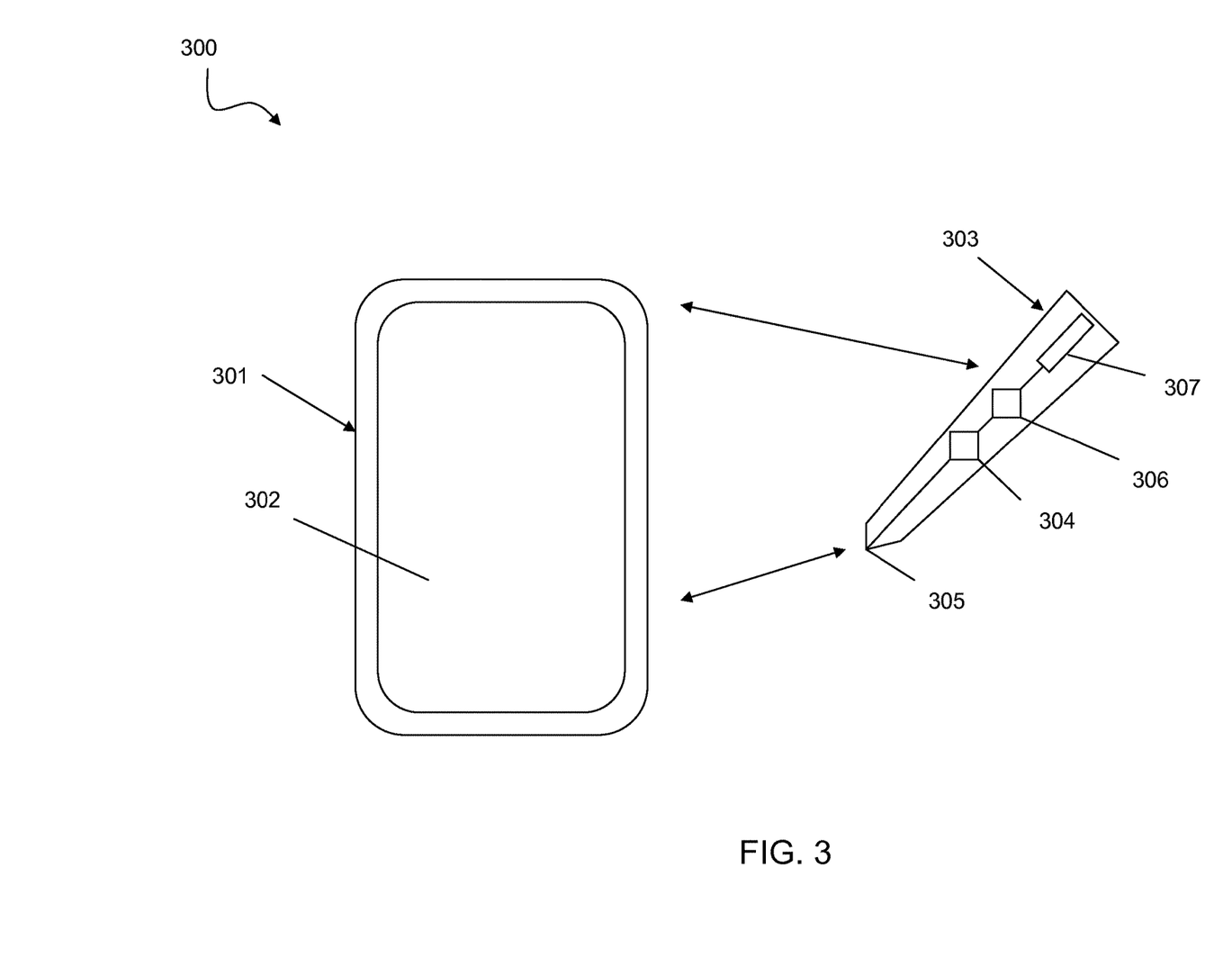
FIG. 3 illustrates an example of smart pen and device communications.

In an embodiment, as illustrated in FIG. 3, a system 300 includes a device 301, e.g., a tablet or smart phone, etc., that include an input component 302, e.g., touch screen or like surface that accepts pen inputs. The input component 302 accepting smart pen input from a smart pen 303 may be co-located with a display surface, as illustrated, but this is not a requirement. The device 301 includes a processor operatively coupled to the input component 302 and a memory storing instructions that are executable by the processor to receive data from the smart pen 303, e.g., at the input component 302, using a low bandwidth pen input data channel, as illustrated. This pen input data includes short range wireless connecting data, as described herein. For example, the pen may be programmed to transmit via an element 305, e.g., an element used to transmit conventional pen input data, connecting data by programming a processor and memory element 304. This may include transmitting data including a pen identification, e.g., MAC address, as well as a security token, e.g., if short range wireless communications are to be secured. The processing element 305 may be powered for example by a rechargeable battery 307.

Using the connecting data transmitted by the pen 303, e.g., via element 304 and element 305 using the low bandwidth pen data channel, the device 301 may establish a short range wireless first time pairing with the smart pen 303 and/or a connection, if a pairing has already been made. This short range wireless connection may be used for communicating larger data files to and from a BLUETOOTH radio 306 included in the pen 303. Thus, the device 301 and/or the pen 303 may communicate, in a connected condition, higher bandwidth data using the short range wireless connection. This permits a great deal of additional data, e.g., including media files and the like, to be transmitted between the pen 303 and the device 301. This may expand uses for the pen 303 and device 301 combinations. For example, the pen may include a camera (not explicitly illustrated) that captures an image that may be transmitted to the device 301 using the short range wireless connection. Additional data may be transmitted, e.g., pen sensor data, gesture input data, etc., such that the functionality of the pen may be greatly extended. For example, a pen may take on many of the functions associated with a current handset by virtue of the additional data communication capabilities.

A smart pen 303, including a tip element 305 and a body housing a processor and a memory 304 storing instructions that are executable by the processor 304 may thus be used to establish such connections with specificity and in an automated fashion. This may include, for example, transmitting connection data to a device 301 using a low bandwidth pen data channel via tip element 305. This may in turn allow the pen 303 to establish, using said data, a short range wireless connection with the device 301, e.g., via further automated pairing communications with the device 301.

As described herein, the higher bandwidth data may include any data commonly transmitted via short range wireless communications, e.g., a media files such as pictures, audio files, video files, etc. In this way, the pen may be included in many other applications resident or hosted by the device 301, not simply dedicated drawing or pen input applications, although these may certainly be supplemented.

The pen data channel may be used actively by the smart pen 303 to communicate pen input data for connecting to the input component 302 of the device 301, e.g., via battery power offered by a battery 307. This may occur according to a policy, e.g., responsive to contact between tip element 305 and input component 302 rather than having device 301 continually or intermittently search for a device such as smart pen 303 to be connected.

Again, the input component 302 may take a variety of forms, e.g., as for example selected from the group consisting of a touch screen and a digitizer, a combination thereof, or any device component that normally accepts pen input data via a pen input data channel. The instructions are further executable by the processor, e.g., of the device 301, to receive data from another smart pen at the device 301 using a low bandwidth pen data channel, said data including short range wireless connecting data for connecting another pen seamlessly. The device 301 may include instructions that are further executable by the processor to establish a short range wireless connection between another smart pen and the device 301, or re-connect the original smart pen 303 at a later time. Likewise, the smart pen 301 may communicate its connecting data using the tip element 305 and low bandwidth pen data channel to automatically connect with another device. In such a case, the connecting between the smart pen 303 and the first device 301 may disconnected, although this is not required.

Thus, the device 301 and/or smart pen 303 may include instructions for automatically switching a connection between a smart pen 303 and the device 301 based on a factor such as a factor selected from the group consisting of proximity between devices and pen input data communication between devices.

Such actions allow the device 301 to communicate, in a connected condition, higher bandwidth data using the short range wireless connection with the smart pen 303, and vice versa. This also permits communicating the higher bandwidth data, e.g., pictures, music files, etc., from the smart pen 303 to the device 301, e.g., for streaming or viewing in connection therewith.

Figure 4:
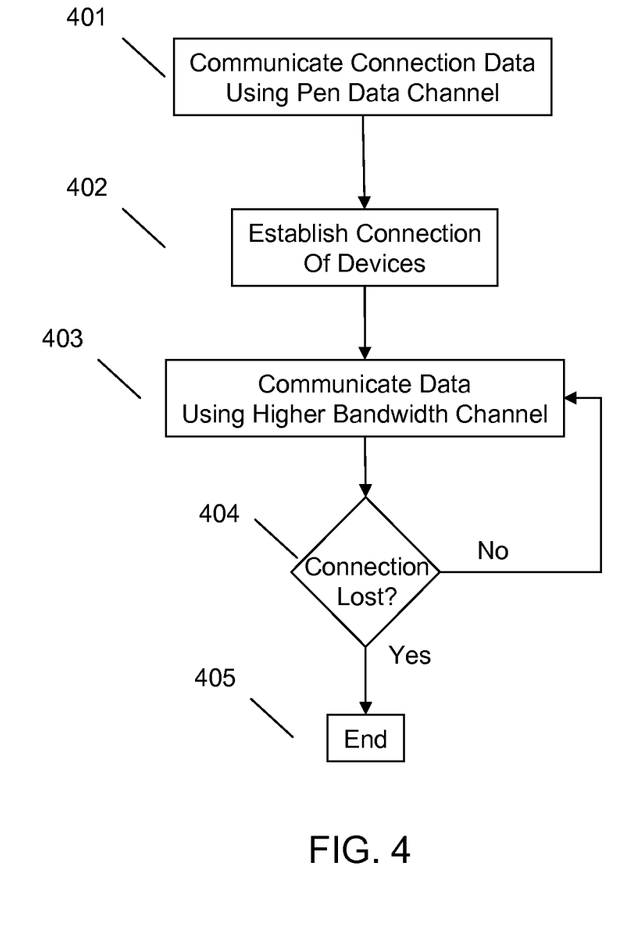
FIG. 4 illustrates an example method of smart pen and device pairing and communicating.

FIG. 4 illustrates a non-limiting example of smart pen connection. For example, an embodiment may provide a method where data from a smart pen is communicated to a device using a low bandwidth pen data channel at 401, e.g., responsive to bringing the smart pen into proximity or contact with the device. As described herein, the data so communicated may include short range wireless connecting data such first time pairing data and/or re-connection data of an established protocol, e.g., BLUETOOTH out-of-band pairing data.

An embodiment then establishes at 402, using said data, a short range wireless connection between the smart pen and the device. This may include for example having a processor of the device receiving the pen data channel data processing this data to extract the necessary element(s) to identify the smart pen and securitize the communication channel during the connection procedure. The securitization process may include adding a security token after the pen data channel data has been extracted for connecting.

Thereafter, an embodiment permits the communication, in a connected condition, of higher bandwidth data between the smart pen and the device using the short range wireless connection at 403. This pairing, as described herein, may be specific, secure, and automatically established via using the connecting data communicated in the pen data channel.

An embodiment may thereafter detect that the connection has been lost or otherwise ended at 405, e.g., via the smart pen connection with another device and not sending pen input data to the original device for a predetermined time. Other ways of ending the connection are of course possible, e.g., a short range wireless communication via smart pen to the original device, a detection of another smart pen using the pen data channel to establish a connection with the device, etc. If the connection continues, e.g., as determined at 405, then higher bandwidth data may of course be included.

Otherwise, the connection may be ended at 406, e.g., by the original device, such that pen may start or continue to be connected with another device, even if within short range wireless range of the original device (e.g., within the same room, etc.). This will prevent the original device from continuing to needlessly accept inputs from the smart pen.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
communicating, using a low bandwidth digital communication mechanism, location data from a smart pen to a writing surface of a device using a pen input data channel having a bandwidth;
said low bandwidth digital communication mechanism being extended to comprise automated short range wireless first time pairing data comprising a pairing passcode;
communicating, from the smart pen to the writing surface of the device, the first time pairing data using the low bandwidth digital communication mechanism based on a policy;
establishing, using said first time pairing data, a short range wireless connection between the smart pen and the writing surface of the device, wherein the short range wireless connection is different from the pen input data channel; and
thereafter communicating, in a connected condition, data requiring a bandwidth greater than the bandwidth of the pen input data channel, between the smart pen and the device using the short range wireless connection, wherein said smart pen continues to communicate said location data associated with the smart pen to the writing surface of the device using the low bandwidth digital communication mechanism.

2. The method of claim 1, wherein the higher bandwidth data includes data selected from the group consisting of a media file, sensor data, and pen button data.

3. The method of claim 1, wherein said pen input channel is used actively by said smart pen to communicate pen input location data to the writing surface of the device.

4. The method of claim 3, wherein said the writing surface is selected from the group consisting of a touch screen, a digitizer, and a combination thereof.

5. The method of claim 1, further comprising communicating data from the smart pen to a second device using the pen input data channel, said data including the first time pairing data.

6. The method of claim 5, further comprising:
establishing a short range wireless connection between the smart pen and the second device.

7. The method of claim 6, further comprising automatically switching a connection between the smart pen and the writing surface of the device and the second device based on a factor selected from the group consisting of proximity and pen input data channel communication.

8. The method of claim 1, wherein communicating, in a connected condition, higher bandwidth data between the smart pen and the device using the short range wireless connection comprises communicating the higher bandwidth data from the smart pen to the device.

9. The method of claim 1, wherein communicating, in a connected condition, higher bandwidth data between the smart pen and the device using the short range wireless connection comprises communicating the higher bandwidth data to the smart pen from the device.

10. A device, comprising:
a writing surface that accepts smart pen input;
a display;
a processor operatively coupled to the writing surface and the display; and
a memory storing instructions that are executable by the processor to:
receive location data from a smart pen at the writing surface of the device using a pen input data channel having a first bandwidth;
said location data being communicated according to a low bandwidth digital communication mechanism that has been extended to comprise short range wireless first time pairing data comprising a pairing passcode;
receive, from the smart pen to the writing surface of the device, the first time pairing data using the low bandwidth digital communication mechanism;
establish, using said first time pairing data, a short range wireless connection with the smart pen, wherein the short range wireless connection is different from the pen input data channel; and
thereafter communicate, in a connected condition with the smart pen, data requiring a bandwidth greater than the bandwidth of the pen input data channel, using the short range wireless connection, wherein said writing surface continues to receive said location data associated with the smart pen from the smart pen using the low bandwidth digital communication mechanism, wherein the communicating comprises a plurality of pairings with a plurality of devices, wherein each of the plurality of pairings comprises a unique data transfer.

11. The device of claim 10, wherein the higher bandwidth data includes data selected from the group consisting of a media file, sensor data, and pen button data.

12. The device of claim 10, wherein said pen input data channel is used actively by said smart pen to communicate pen input location data to the writing surface of the device.

13. The device of claim 10, wherein said writing surface is selected from the group consisting of a touch screen, a digitizer and a combination thereof.

14. The device of claim 10, wherein the instructions are further executable by the processor to receive data from another smart pen at the writing surface of the device using a pen input data channel, said data including the first time pairing data.

15. The device of claim 14, wherein the instructions are further executable by the processor to:

establish a short range wireless connection between the another smart pen and the device.

16. The device of claim 15, wherein the instructions are further executable by the processor to automatically switch a connection between a smart pen and the device based on a factor selected from the group consisting of proximity and pen input data channel communication.

17. The device of claim 10, wherein to communicate, in a connected condition, higher bandwidth data using the short range wireless connection comprises communicating the higher bandwidth data from the device to the smart pen.

18. A smart pen, comprising:

a tip; and a body;

the body includes a processor and a memory storing instructions that are executable by the processor to:

transmit, using a low bandwidth digital communication mechanism, location data to a writing surface of a device using a pen input data channel;

said low bandwidth digital communication mechanism being extended to comprise automated short range wireless first time pairing data comprising a pairing passcode;

communicating, from the smart pen to the writing surface of the device, the first time pairing data using the low bandwidth digital communication mechanism based on a policy;

establish, using said first time pairing data, a short range wireless connection with the writing surface of the device, wherein the short range wireless connection is different from the pen input data channel; and thereafter communicate, in a connected condition with the device, data requiring a bandwidth greater than the bandwidth of the pen input data channel, using the short range wireless connection, wherein said smart pen continues to communicate said location data associated with the smart pen to the writing surface of the device using the low bandwidth digital communication mechanism, wherein the communicating comprises a plurality of pairings with a plurality of devices, wherein each of the plurality of pairings comprises a unique data transfer.

* * * * *